Dec. 29, 1959

W. G. CAMPBELL ET AL 2,918,849

AUTOMATIC HOBBING MACHINE

Filed July 1, 1957

INVENTOR.
WILLIAM G. CAMPBELL
and PETER W. KELLY
BY
ATTORNEYS

Dec. 29, 1959   W. G. CAMPBELL ET AL   2,918,849
AUTOMATIC HOBBING MACHINE
Filed July 1, 1957   4 Sheets-Sheet 2

INVENTOR.
WILLIAM G. CAMPBELL
and PETER W. KELLY
BY Carlson, Pitzner,
Hubbard & Wolfe
ATTORNEYS Dec. 29, 1959 — W. G. CAMPBELL ET AL — 2,918,849
AUTOMATIC HOBBING MACHINE
Filed July 1, 1957 — 4 Sheets-Sheet 3

INVENTOR.
WILLIAM G. CAMPBELL
and PETER W. KELLY
BY Carlson, Pitzner, Hubbard & Wolfe
ATTORNEYS Dec. 29, 1959  W. G. CAMPBELL ET AL  2,918,849
AUTOMATIC HOBBING MACHINE
Filed July 1, 1957  4 Sheets-Sheet 4
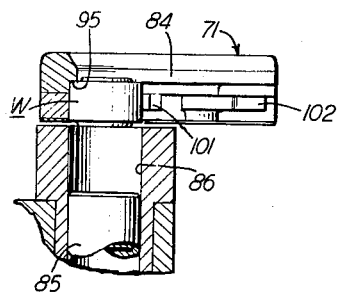
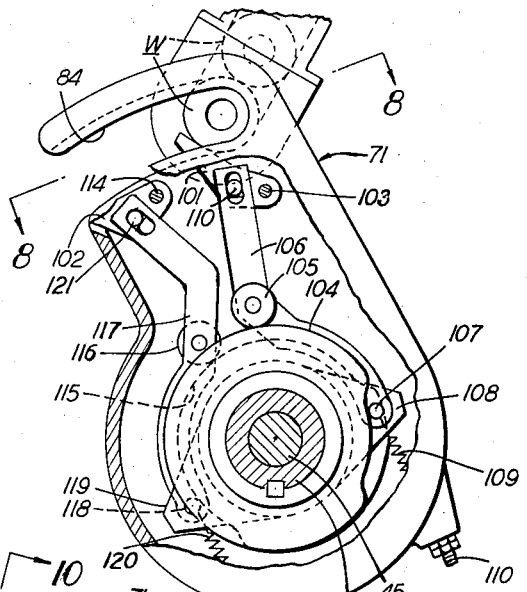
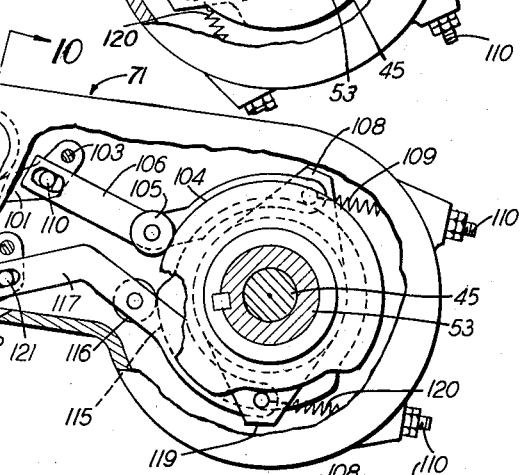
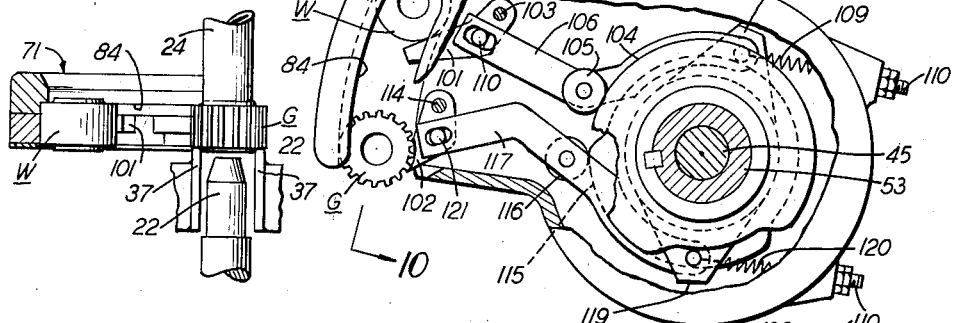
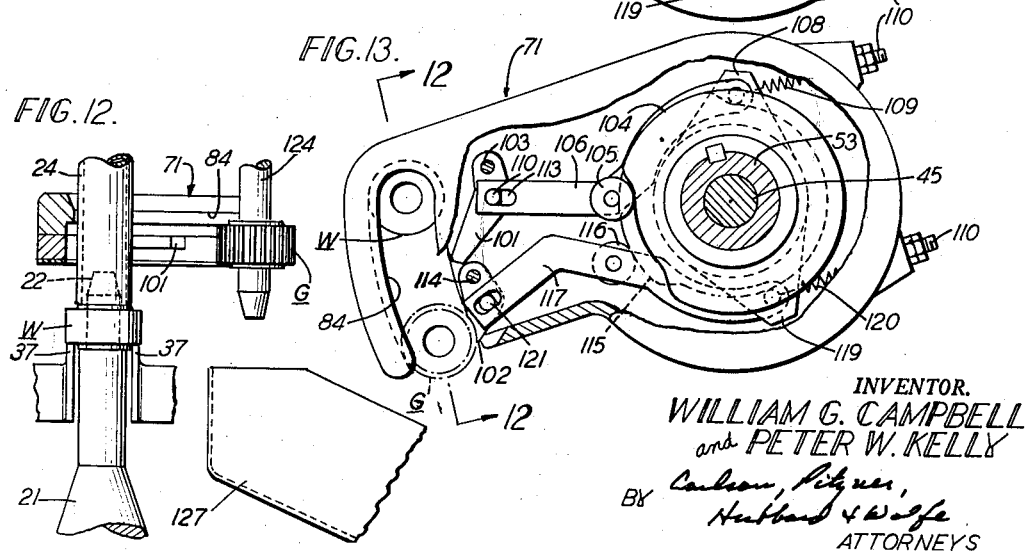
INVENTOR.
WILLIAM G. CAMPBELL
and PETER W. KELLY
BY Carlson, Pitzner,
Hubbard & Wolfe
ATTORNEYS United States Patent Office 2,918,849
Patented Dec. 29, 1959

2,918,849

AUTOMATIC HOBBING MACHINE

William G. Campbell and Peter W. Kelly, Rockford, Ill., assignors to Barber-Colman Company, Rockford, Ill., a corporation of Illinois Application July 1, 1957, Serial No. 669,196

8 Claims. (Cl. 90—1)

This invention relates to hobbing machines which are used for cutting gears, splines and the like and in which a workpiece is supported on a work spindle and hobbed by a cutter supported on a tool spindle. More particularly, the invention relates to an automatic hobbing machine in which a transfer member moves across the axis of the work spindle and delivers a gear blank to and carries a finished gear away from the spindle.

The general object of the invention is to provide a new and improved hobbing machine of the above character in which the loading and unloading mechanisms, and particularly the transfer member, are constructed and arranged in a novel manner so as to retain positive control over both the blanks and the finished gears from the time a blank is received in the transfer member until it is discharged from the machine as a finished gear.

A more detailed object is to provide grippers which positively hold the blank on the transfer member until it is engaged by elements for loading and unloading the workpiece on the work spindle and which engage the finished gear before it is released by those elements.

The invention also resides in the novel construction and arrangement of the grippers and the manner in which they are associated with the transfer member.

Other objects and advantages of the invention will become apparent from the following detailed description taken in connection with the accompanying drawings, in which Figure 1 is a fragmentary front elevation of a hobbing machine incorporating the novel features of the present invention.

Fig. 8 is a fragmentary sectional view taken along the line 8—8 in Fig. 9.

Fig. 9 is a view similar to Fig. 5 and shows the transfer member in the starting position.

Fig. 10 is a fragmentary sectional view taken along the line 10—10 in Fig. 11.

Fig. 11 is a view similar to Fig. 9 but shows the transfer member in an intermediate position.

Fig. 12 is a fragmentary sectional view taken along the line 12—12 in Fig. 13.

Fig. 13 is a view similar to Fig. 11 but shows the transfer member in the advanced position.

Figure 5:
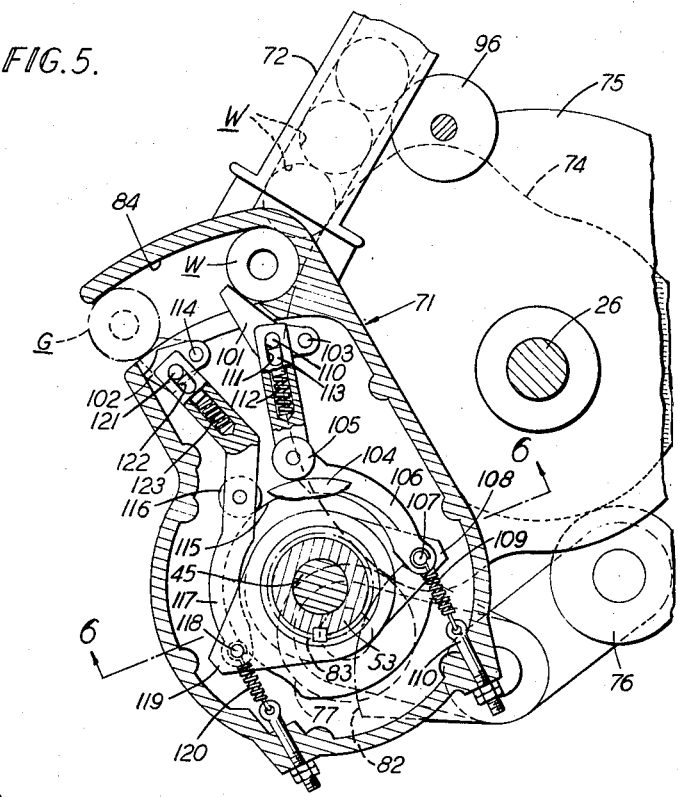
Fig. 5 is a fragmentary sectional view taken along the line 5—5 in Fig. 1.

For purposes of illustration, the invention is shown in the drawings embodied in a vertical hobbing machine in which the work blanks W and the finished gears G (Fig. 5) are loaded and unloaded automatically. A machine of this type is disclosed in the copending application of Augustus C. Durdin III, Serial No. 607,085, filed August 30, 1956, to which reference may be had for details of construction. In general, the hobbing machine comprises a base 20 supporting the various operative elements and the blank W from which a gear is hobbed is supported on a vertical spindle 21 upstanding from the base and turned by a suitable drive motor (not shown).

Figure 4:
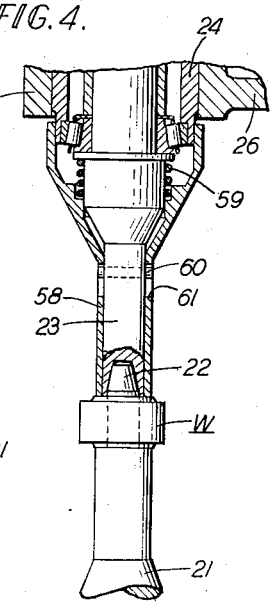
Fig. 4 is an enlarged fragmentary sectional view taken along the line 4—4 in Fig. 1.

The gear blank is received on an arbor 22 (see Fig. 4) which projects upwardly from the upper end of the spindle 21 and through a bore in the blank. As is well known in the art, the arbor may be expanded pneumatically against the wall of the bore to cause the blank to rotate with the spindle. To hold the blank down on the spindle, a hollow vertical tail stock 23 journaled in a slide 24 engages the top of the work. The slide is movable up and down in a cylinder 25 on the side of a hollow column 26 upstanding from the base 20.

For loading and unloading the blanks W, the slide 24 is moved up to back the tail stock 23 away from the spindle 21 so that a blank may be slipped onto and off the arbor 22. Such movement of the slide is effected by a vertical camshaft 27 which is journaled in the column 26 and is driven through cycles of one revolution by a motor 28 through suitable reduction gearing 29. As disclosed in the aforesaid Durdin application, two cams 30 and 31 fast on the camshaft engage respectively follower rollers 32 and 33 which are on the ends of horizontal arms 34 and 35. The latter are connected to a vertical shaft 36 journaled in the column 26 and the cams are shaped to oscillate this shaft as the camshaft turns. Through suitable gearing (not shown), oscillation of the shaft 36 raises and lowers the slide 24, the slide being raised and lowered once during each revolution of the camshaft.

Figure 2:
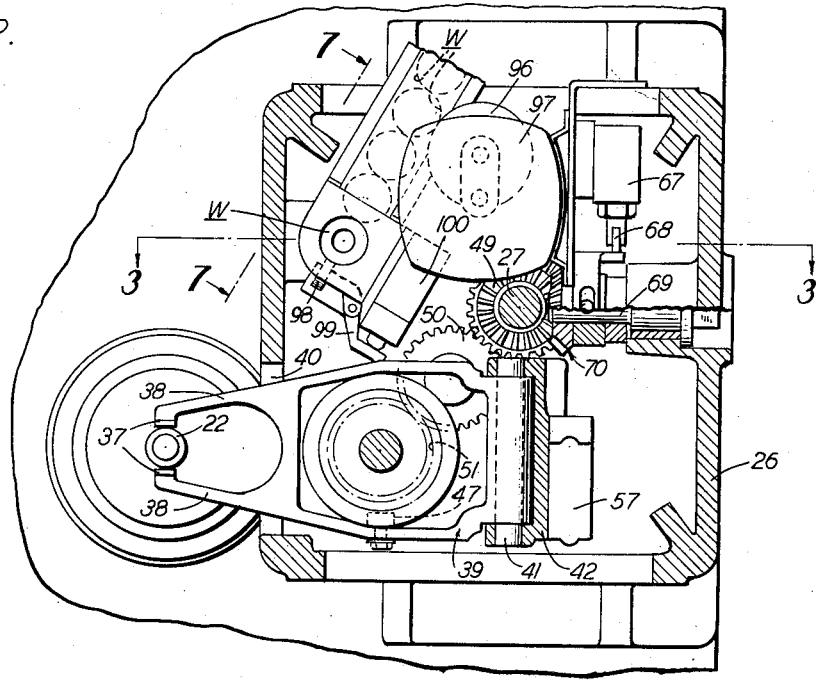
Fig. 2 is a sectional view taken along the line 2—2 in Fig. 1.
Figure 6:
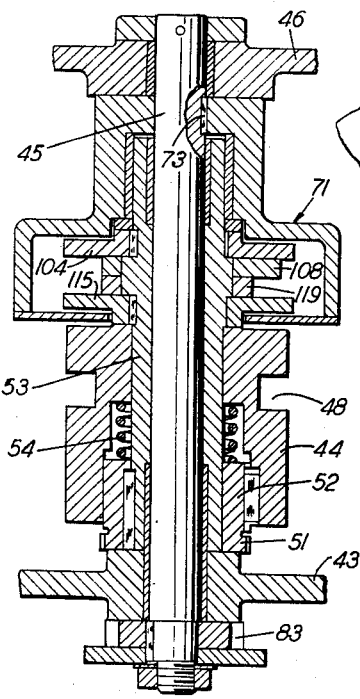
Fig. 6 is a sectional view taken along the line 6—6 in Fig. 5.

To unload the finished gears from the work spindle 21, the tail stock 23 is raised and the gears are lifted off the arbor 22 so that they may be shifted laterally out from between the tail stock and the arbor. Lifting of the finished gears is effected automatically and at the proper time by fingers 37 (Fig. 2) which engage the underside of the gear and are moved up by the camshaft 27. Herein, the fingers straddle the spindle and are formed as inturned projections on the ends of the arms 38 of a U-shaped lever 39. The lever is disposed horizontally within the column 26 with the arms 38 projecting out through an opening 40 and is fulcrumed at the inner ends of the arms by a pin 41 on a bracket 42 upstanding from a wall 43 within the column 26. The arms straddle a barrel cam 44 rotatably mounted on an upright shaft 45 (Fig. 6) which is journaled at opposite ends in the wall 43 and a second wall 46 of the column 26. A pin 47 (Fig. 2) projects inwardly from one of the arms 38 and into a cam groove 48 on the cam so that, as the latter is turned, the lever 39 is swung up and down about its fulcrum 41 thereby raising and lowering the fingers 37.

Figure 3:
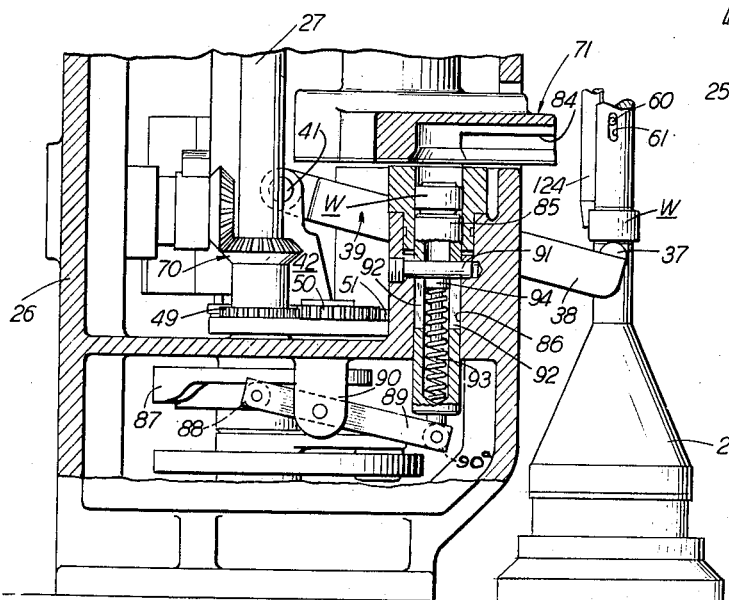
Fig. 3 is a fragmentary sectional view taken along the line 3—3 in Fig. 2.

To turn the cam 44 from the camshaft 27, a gear 49 (Figs. 2 and 3) fast on the camshaft meshes with a gear 50 on a vertical shaft which is journaled in the column 26 between the camshaft and the shaft 45. The gear 50, in turn, meshes with a gear 51 (Fig. 6) which is integrally formed on the lower end of a sleeve 52 surrounding and keyed to an inner sleeve 53, the latter being rotatably mounted on the shaft 45. The sleeve 52 is disposed inside of and is keyed to the barrel cam 44 so that the gears 49, 50 and 51, which are the same size, turn the cam once for each revolution of the camshaft 27. A helical compression spring 54 acting between the upper end of the sleeve 52 and the interior of the cam 44 normally holds these two parts in the relative positions shown in Fig. 6 but yields to prevent damage in the event a finished gear jams on the arbor 22 and cannot be removed by the fingers 37. Yielding of the cam swings a lever 55 (Fig. 1) about its fulcrum 56 to actuate a switch 57 which stops the machine.

As the finished gears are raised by the fingers 37, they are held down on the fingers by a sleeve 58 which encircles and is slidable on the tail stock 23. The sleeve is urged downwardly relative to the tail stock by a compression spring 59 (Fig. 4) disposed within the sleeve and acting between the latter and the tail stock. The amount the sleeve can slide is limited by a pin 60 whose end projects laterally from the tail stock and into a vertical slot 61 in the sleeve.

Figure 1:
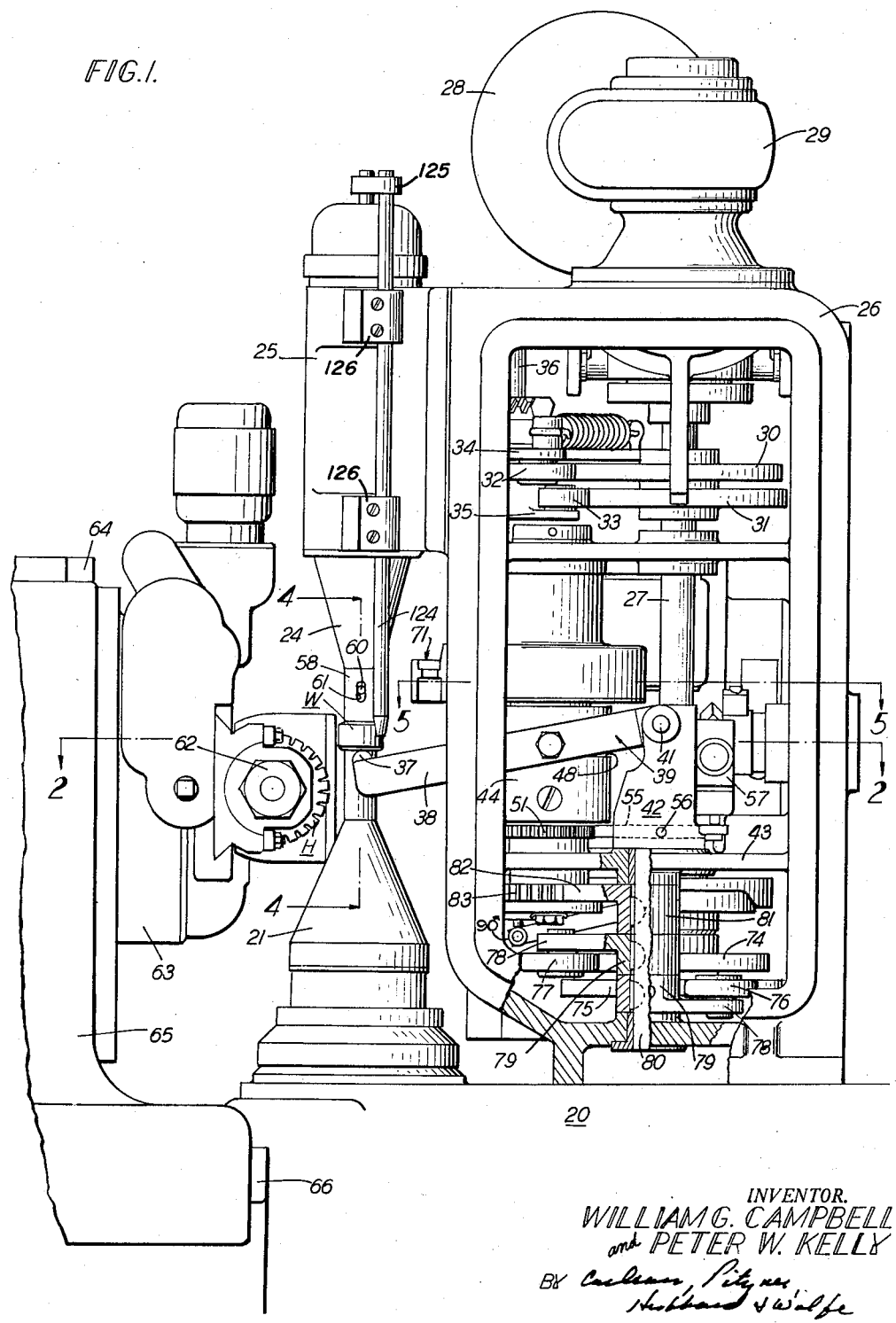

As shown in Fig. 1, the hob H is supported on a tool spindle 62 which extends transversely of the work spindle 21 and herein is horizontal. The hob, at the start of a cycle, is in the position illustrated in Fig. 1 and first is moved horizontally toward the work spindle and then is fed up into the gear blank W. After the cut is completed, the hob is backed out and then is rapid traversed down to its starting position.

To obtain the desired movements of the hob H, the tool spindle 62 is carried on a tool head 63 which slides up and down in ways 64 on a saddle 65. The latter slides horizontally on ways 66 on the base 20. The head and the saddle are moved along their respective ways by suitable power actuators which are energized in a manner known in the art to provide the proper program of hob movement. Movement of the hob H is utilized to initiate a cycle of the camshaft 27, that is, the motor 23 is started in any suitable manner as the hob is backed out. The cycle of the camshaft is terminated by a switch 67 (Fig. 2) which is actuated by a cam 68 fast on a horizontal shaft 69, the latter being driven by the camshaft through bevel gears 70.

In order to load the blanks W on the work spindle 21, a member 71 receives the blanks from a suitable supply hopper (not shown) through a chute 72 (Fig. 7) and carries the blank horizontally from the chute to the spindle. At the same time, the member 71 picks up the finished gear G on the spindle and carries it laterally to a discharge position. Herein, the transfer member 71 is in the form of a hollow horizontal arm keyed at 73 to the shaft 45 (Fig. 6) and disposed above the barrel cam 44. The shaft 45 is oscillated, and hence the arm 71 is swung back and forth by two cams 74 and 75 fast on the lower end of the camshaft 27 (Fig. 1). As in the case of the cams 30 and 31, the cams 74 and 75 coact with follower rollers 76 and 77 which are on the ends of arms 78 on sleeves 79. The latter are pinned to a vertical shaft 80 which is journaled in the column 26. A third sleeve 81 also is pinned to this shaft and carries integrally therewith a sector gear 82 meshing with a gear 83 which is keyed to the lower end of the shaft 45. Thus, the cams 74 and 75 oscillate the shaft 80 which, in turn, oscillates the shaft 45.

At the start of each cycle, the arm 71 is disposed at one side of the spindle axis and, during the loading period, is swung forward (counterclockwise in Fig. 5) and back. Near its outer end, the arm 71 is formed with a forwardly opening arcuate slot 84 which is wide enough to receive a work blank W. In the starting position (Fig. 9), the arm receives a blank which is placed in the inner end of the slot 84. The arm then is turned to position the outer end of the slot in line with the axis of the spindle 21 so that the finished gear G on the arbor 22 may be placed in the slot as shown in Fig. 11. Next, the arm is turned further to locate the blank along the spindle axis as illustrated in Fig. 13. In this position, the blank is placed on the arbor and the finished gear is unloaded from the machine. Finally, the arm is swung back to the starting position. The cams 74 and 75 are shaped to produce the foregoing motion of the arm, providing a short dwell period in the positions shown in Figs. 11 and 13 on the forward stroke.

Figure 7:
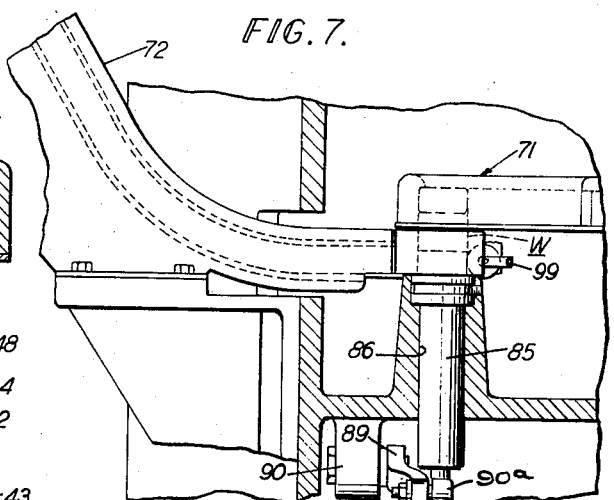
Fig. 7 is a fragmentary sectional view taken along the line 7—7 in Fig. 2.

As illustrated in Fig. 7, the chute 72 terminates beneath the arm 71 when the latter is in the starting position and the end blank W in the chute is directly under the inner end of the slot 84 in the arm. This blank is lifted up into the slot by a vertical plunger 85 (Fig. 3) sliding in a bore 86 in the column 26. The plunger is raised and lowered at the proper times under the control of a face cam 87 fast on the camshaft 27. The cam coacts with a follower roller 88 journaled on one end of a horizontal lever 89 which is fulcrumed intermediate its ends on a bracket 90 depending from the wall 43 in the column 26, the other end of the lever carrying a roller 90a which abuts against the lower end of the plunger.

The plunger 85, which is hollow, is held against turning while being permitted to slide by a pin 91 which projects through alined slots 92 in the plunger. A helical compression spring 93 is disposed within the plunger and acts between the lower end of the plunger and a stud 94 which abuts against the pin 91. The spring holds the roller 88 against the cam 87 and serves to return the plunger after it has raised the blank W into the slot 84. The plunger raises the blank until the latter abuts a flange 95 (Fig. 8) projecting in over the slot around the periphery thereof.

To insure that the end blank W in the chute 72 is properly positioned relative to the plunger 85, a rubber roller 96 (Fig. 2) driven by a motor 97 which is supported within the column 26 projects into the side of the chute and frictionally engages the blanks to urge them toward the end of the chute. A feeler 98 located at the end of the chute senses the position of the end blank and, through an arm 99, is connected to a switch 100 (Fig. 2) which stops the hobbing machine if this blank is not directly over the plunger 85.

In accordance with the present invention, the loading mechanism and particularly the transfer arm 71 is constructed and arranged in a novel manner so as to maintain positive control of both the blanks W and the finished gears G at all times. To this end, means is provided to grip the blank W and hold it positively from the time it is placed in the transfer arm until it is discharged from the machine as a finished gear. This means includes a first gripper or finger 101 (Fig. 5) which engages the blank W in the slot 84, the sleeve 58 and fingers 37 which hold the blank as the latter is placed on and removed from the arbor 22 and a second gripper or finger 102 which holds the finished gear G as it is transferred by the arm 71 to the discharge position.

Herein, the finger 101 (see Fig. 5) is in the form of an L-shaped lever disposed within the arm 71 and pivoted at 103 to swing about an upright axis. The free end of the lever projects into the slot 84 to engage the blank W and hold the latter against the end of the slot. The finger 101 is moved into and out of engagement with the blank in timed relation with the movements of the other parts of the machine by a cam 104 which is disposed within the arm 71 around the shaft 45 and is keyed to the sleeve 53 (see Fig. 6) to turn with the barrel cam 44. Cooperating with the cam 104 is a follower roller 105 journaled on a horizontal lever 106 intermediate the ends thereof. The inner end of the lever is pivotally connected at 107 to a ring 108 which surrounds and is free to turn on the sleeve 53. A contractile spring 109 acts between the ring and a stud 110 anchored in the arm 71 and holds the follower 105 against the cam 104 and thus the ring and the lever 106 turn bodily with the transfer arm about the axis of the shaft 45.

The free end of the lever 106 is connected to the finger 101 intermediate the ends thereof by a pin 110 rigid with the finger and projecting through a longitudinal slot 111 in the lever. The end portion of the latter is hollow and encases a compression spring 112 which acts between the lever and a sliding stud 113 abutting against the pin 110. The spring urges the finger 101 against the blank W and yields to permit some overtravel of the lever 106.

The finger 102 also is in the form of a short lever pivotally mounted at 114 in the arm 71 and the free end of this finger has an arcuate contour to engage a portion of the periphery of the finished gear G and hold the gear against the outer wall of the slot 84. A similar arrangement is utilized to swing the finger 102 at the proper times. Thus, a cam 115 keyed to the sleeve 53 engages a follower roller 116 which is journaled on a lever 117. As in the case of the lever 106, the lever 117 is pivotally connected at 118 to a ring 119 which is freely rotatable on the sleeve 53 and is biased by a contractile spring 120 to hold the follower against the cam. The free end of the lever 117 is connected to the finger 102 by a pin and slot connection 121, 122 and a spring 123 yieldably urges the finger toward the gear G.

The cams 104 and 115 are shaped to compensate for the fact that the followers 105 and 116 turn bodily with the transfer arm 71 and, therefore, at times turn with the cams. The periphery of the cam 104 causes the finger 101 to be retracted until the plunger 85 raises a blank W into the slot 84 and then the cam swings the finger into engagement with the blank to clamp the latter against the wall of the slot. The cam holds the finger in this position until the blank is gripped between the fingers 37 and the sleeve 58 which lower the blank onto the arbor 22.

As the transfer arm 71 is swung to the intermediate position shown in Fig. 11, the cam 115 causes the finger 102 to be retracted until the finished gear G is raised into the slot 84 by the fingers 37. Before the gear is released from between the fingers 37 and the sleeve 58, the cam 115 swings the finger 102 into clamping engagement with the gear and this condition remains as the transfer arm 71 is swung to the advanced position shown in Fig. 13.

Before the finger 102 releases the finished gear G, the cams 30 and 31 lower the slide 24 and a vertical rod 124 (Fig. 1) which is attached to the slide by an arm 125 and slides in guides 126 on the side of the cylinder 25, is projected down through the bore of the gear. The cam 115 then retracts the finger 102 to release the gear which slides down the rod 124 and into a chute 127 (Fig. 13), the rod positively guiding the gear into the chute.

Operation

With the parts in the position shown in Fig. 1, a blank W is held on the spindle 21 and the hob H is beneath the blank. At this time, the transfer arm 71 is in the initial or retracted position as shown in Fig. 9, the finger a blank is held in the slot 84 by the finger 101, the finger 102 being retracted. Also, the plunger 85 is down and the end blank in the chute 72 is positioned over the plunger. The motor 28 is deenergized so that the camshaft 27 is stationary. The cycle starts by the saddle 65 moving forward and then the tool head 63 moving up to feed the hob into the blank as the work spindle 21 is turned.

When the cutting stroke is completed, the saddle 65 is moved back to back out the tool and the motor 28 is energized to initiate a one revolution cycle of the camshaft 27. As the camshaft begins to turn, the cams 74 and 75 turn the shaft 45 through the sector gear 82 and the gear 83 and this swings the transfer arm 71 counterclockwise as viewed in Fig. 9. When the arm reaches the position illustrated in Fig. 11, the cams cause the arm to dwell momentarily. During this movement of the transfer arm, the cams 30 and 31 raise the slide 24 and simultaneously the barrel cam 44 raises the arms 38 so that the fingers 37 lift the finished gear off of the arbor 22 and hold it against the sleeve 58. At a result, the gear is raised and enters the slot 84 as the transfer arm reaches the intermediate position.

While the arm 71 is dwelling at the mid position, the cam 115 swings the finger 102 into clamping engagement with the gear. Subsequently and while the arm is still dwelling at the mid position, the slide 24 is raised slightly by the cams 30 and 31 and the fingers 37 are lowered by the cam 44 to release the gear which then is held solely by the finger 102. Next, the cams 74 and 75 continue the swinging of the transfer arm until the latter reaches the advanced position shown in Fig. 13.

With the transfer arm 71 in the advanced position, the blank W carried thereby is directly over the arbor 22. As soon as the arm reaches this position, the cams 30 and 31 lower the slide 24 and hence the tail stock 3 into engagement with the blank held on the transfer arm and simultaneously the cam 44 raises the fingers 37 into engagement with the underside of the blank. Then the cam 104 swings the clamping finger 101 away from the gear blank which thus is held only by the slide and the fingers 37. Next, the slide 24 and the fingers 37 move down together under the control of the cams 30, 31 and 44 to lower the blank onto the arbor 22. This also lowers the rod 124 down through the bore of the finished gear G which is held on the transfer arm. After the rod is projected down through the gear bore, the cam 115 swings the gripping finger 102 away from the finished gear which thus slides by gravity down the rod and into the chute 127.

When the blank W has been placed on the arbor 22 and the finished gear G released from the transfer arm 71, the latter is swung back to the starting position by the cams 74 and 75. As the arm reaches this position, the face cam 87 raises the plunger 85 which thus lifts the end blank in the chute 72 up into the transfer arm. Next, the cam 104 swings the gripping finger 101 into clamping engagement with this blank and thereafter the plunger is lowered under the action of the cam 87. When the plunger is returned to its lowermost position, the blanks in the chute 72 advance to present another blank over the plunger, this advance of the blanks being aided by the rubber roller 96 which frictionally engages the blanks in the chute. Finally, the cam 68 actuates the switch 67 which deenergizes the motor 28 and stops the camshaft 27. The hobbing machine then is in condition to repeat the cycle described above.

It will be observed that each blank is positively held at all times from the time it enters the transfer arm 71 until its discharge into the chute 127 as a finished gear. Thus, the finger 101 holds the blank as it is moved into alinement with the arbor 22. The sleeve 58 and the fingers 37 engage and hold the blank before it is released by the finger 101 and positively place the blank on the arbor. The finished gear G is clamped between the sleeve 58 and the fingers 37 as it is raised off of the arbor and the gear is clamped by the gripper 102 before it is released from between the fingers and sleeve. Moreover, the rod 124 positively guides the gear into the chute 127. As a result, the chances of a blank or a finished gear jamming in the machine are minimized.

We claim:

1. In a machine tool, the combination of, a vertical work supporting spindle for holding a workpiece, a member mounted to move transversely across the axis of said spindle and above the spindle, said member having a forwardly opening slot for receiving a workpiece, mechanism for moving said member from a starting position at one side of said spindle to a dwell position in which a portion of said slot is alined with said axis, a flange extending along the upper edge of said slot, a vertical plunger disposed beneath said portion of said slot when said member is in said starting position, means for delivering workpieces to the top of said plunger, means for moving said plunger up to position a workpiece in said portion and against said flange, elements disposed generally coaxially of said spindle and operable to clamp a workpiece between them, mechanism operable during the dwell of said member to move said elements into clamping engagement with a workpiece in said portion and to lower said workpiece onto said spindle, a gripper mounted on said member and operable to engage and hold a workpiece disposed in said portion, and mechanism operated in timed relation to the operations of said member, said plunger and said elements and operable to cause said gripper to engage a workpiece after said plunger has raised the workpiece into said slot and to remain in engagement with the workpiece until the latter is clamped by said elements.

2. In a machine for hobbing teeth on a workpiece, the combination of, a base, a work supporting spindle for holding a workpiece while the latter is machined, a cutter operable to hob teeth on the workpiece, an arm mounted on said base to turn about an axis paralleling the axis of said spindle to swing forwardly across the spindle axis and back, said arm having a forwardly opening slot which intersects said spindle axis upon swinging of the member and which is adapted to receive workpieces, mechanism for swinging said arm and operable to dwell the arm first with an outer portion of said slot alined with said spindle axis and then with an inner portion of the slot alined with the spindle axis, elements engageable with the workpiece held in said slot and in alinement with said spindle axis and operable to move the workpiece toward and away from said spindle, mechanism operable during said first dwell to cause said elements to engage a finished workpiece on said spindle and move the workpiece into said outer portion and operable during said second dwell to engage an unfinished workpiece in said inner portion and move the same onto said spindle, first and second grippers mounted on said arm and operable to engage and hold respectively an unfinished workpiece in said inner portion and a finished workpiece in said outer portion, a rotary cam device coaxial with the axis of said arm and operable to turn continuously as said arm turns through said first dwell and to said second dwell, and followers connected to said grippers and coacting with said cam device to cause said first gripper to engage an unfinished workpiece until said elements engage the workpiece during said second dwell and to cause said second gripper to engage a finished workpiece before the latter is released by said elements during said first dwell.

3. In a machine for hobbing teeth on a workpiece, the combination of, a base, a work supporting spindle for holding a workpiece while the latter is machined, a cutter operable to hob teeth on the workpiece, an arm mounted on said base to turn about an axis paralleling the axis of said spindle to swing forwardly across the spindle axis and back, said arm having a forwardly opening slot which intersects said spindle axis upon swinging of the member and which is adapted to receive workpieces, mechanism for swinging said arm and operable to dwell the arm first with an outer portion of said slot alined with said spindle axis and then with an inner portion of the slot alined with the spindle axis, elements engageable with the workpiece held in said slot and in alinement with said spindle axis and operable to move the workpiece toward and away from said spindle, mechanism operable during said first dwell to cause said elements to engage a finished workpiece on said spindle and move the workpiece into said outer portion and operable during said second dwell to engage an unfinished workpiece in said inner portion and move the same onto said spindle, first and second grippers mounted on said arm and operable to engage and hold respectively an unfinished workpiece in said inner portion and a finished workpiece in said outer portion, and means operable in timed relation to both of said mechanisms to cause said first gripper to engage an unfinished workpiece until said elements engage the workpiece during said second dwell and to cause said second gripper to engage a finished workpiece before the latter is released by said elements during said first dwell.

4. In a machine for hobbing teeth on a workpiece, the combination of, a base, a work supporting spindle for holding a workpiece while the latter is machined, a cutter operable to hob teeth on the workpiece, a member mounted to move back and forth across the axis of said spindle and having a forwardly opening slot for receiving workpieces, a flange extending around said slot on the side remote from said spindle, mechanism for moving said member and operable to dwell the member first with an outer portion of said slot alined with said axis and then with an inner portion of the slot alined with the axis, elements movable coaxially of said spindle and operable to clamp a workpiece between them, mechanism operable during said first dwell to cause said elements to clamp a finished workpiece on said spindle and move the workpiece against said flange in said outer portion and operable during said second dwell to engage an unfinished workpiece in said inner portion and move the latter away from said flange and onto said spindle, first and second grippers mounted on said arm and operable to engage and hold respectively an unfinished workpiece in said inner portion and a finished workpiece in said outer portion, and means operable in timed relation to both of said mechanisms to cause said first gripper to engage an unfinished workpiece until said elements engage the workpiece during said second dwell and to cause said second gripper to engage a finished workpiece before the latter is released by said elements during said first dwell.

5. In a machine for hobbing teeth on a workpiece, the combination of, a base, a work supporting spindle for holding a workpiece while the latter is machined, a cutter operable to hob teeth on the workpiece, a member mounted to move back and forth across the axis of said spindle and having a forwardly opening slot for receiving workpieces, mechanism for moving said member and operable to dwell the member first with an outer portion of said slot alined with said axis and then with an inner portion of the slot alined with the axis, an element generally coaxial with said spindle and movable through said slot and toward said spindle, a finger disposed alongside said spindle and movable toward said element to clamp a workpiece between the finger and the element, mechanism operable during said first dwell to cause said finger and said element to clamp a finished workpiece on said spindle and move the workpiece into said outer portion and during said second dwell to clamp an unfinished workpiece in said inner portion and move the latter onto said spindle, first and second grippers mounted on said member to engage and hold respectively an unfinished workpiece in said inner portion and a finished workpiece in said outer portion, and means operated in timed relation with both of said mechanisms and operable to cause said first gripper to engage an unfinished workpiece until the latter is engaged by said element and said finger during said second dwell and to cause said second gripper to engage a finished workpiece before the latter is released by the element and the finger during said first dwell.

6. In a machine for hobbing teeth on a workpiece, the combination of, a base, a work supporting spindle for holding a workpiece while the latter is machined, a cutter operable to hob teeth on the workpiece, a member mounted to move back and forth across the axis of said spindle and having a forwardly opening slot for receiving workpieces, mechanism for moving said member and operable to dewell the member first with an outer portion of said slot alined with said axis and then with an inner portion of the slot alined with the axis, elements engageable with a workpiece held in said slot and in alinement with said axis and operable to move a workpiece toward and away from said spindle, mechanism operable during said first dwell to cause said elements to move a finished workpiece from said spindle into said outer portion and during said second dwell to move an unfinished workpiece from said inner portion onto said spindle, first and second fingers mounted on said member to move into said slot and engage and hold respectively an unfinished workpiece in said inner portion and a finished workpiece in said outer portion, and means operated in timed relation with both of said mechanisms and operable to cause said first finger to engage an unfinished workpiece until the latter is engaged by said elements during said second dwell and to cause said second finger to engage a finished workpiece before the latter is released by said elements during said first dwell.

7. In a machine for hobbing teeth on a workpiece, the combination of, a base, a work supporting spindle for holding a workpiece while the latter is machined, a cutter operable to hob teeth on the workpiece, a member mounted to move back and forth across the axis of said spindle and having a forwardly opening slot for receiving workpieces, mechanism for moving said member and operable to dwell the member first with an outer portion of said slot alined with said axis and then with an inner portion of the slot alined with the axis, first and second grippers mounted on said member and operable to engage and hold respectively an unfinished workpiece in said inner portion and a finished workpiece in said outer portion, elements engageable with a workpiece held in said slot and in alinement with said axis and operable to move the workpiece toward and away from said spindle, and mechanism operable to cause said first gripper to engage an unfinished workpiece until said member reaches said second dwell and to cause said second gripper to engage a finished workpiece during said first dwell and until said second dwell, said mechanism also being operable during said first dwell to engage and move a finished workpiece into said outer portion until the workpiece is engaged by said second gripper and being operable during said second dwell and before said first gripper releases the unfinished workpiece to engage the latter for movement away from said member and toward said spindle.

8. In a machine for machining a workpiece, the combination of, a base, a work supporting spindle for holding a workpiece while the latter is machined, a cutter operable to machine the workpiece, a member mounted to move back and forth across the axis of said spindle and having means for receiving workpieces thereon, mechanism for moving said member and operable to dwell the member first with a first portion alined with said axis and then with a second portion alined with the axis, first and second grippers mounted on said member and operable to engage and hold respectively a finished workpiece on said first portion and an unfinished workpiece on said second portion, elements engageable with a workpiece held on said member and in alinement with said axis and operable to move the workpiece toward and away from said spindle, and mechanism operable to cause said first gripper to engage an unfinished workpiece until said member reaches said second dwell and to cause said second gripper to engage a finished workpiece during said first dwell and until said second dwell, said mechanism also being operable during said first dwell to engage and move a finished workpiece onto said first portion until the workpiece is engaged by said second gripper and being operable during said second dwell and before said first gripper releases the unfinished workpiece to engage the latter for movement away from said member and toward said spindle.

References Cited in the file of this patent

UNITED STATES PATENTS

| 2,389,083 | Rosengren | Nov. 13, 1945 |
| 2,411,110 | Pruitt | Nov. 12, 1946 |
| 2,778,279 | Moncrieff | Jan. 22, 1957 |